US 9,917,917 B2

United States Patent
Scott et al.

(10) Patent No.: US 9,917,917 B2
(45) Date of Patent: *Mar. 13, 2018

(54) PREFETCHING OF VIDEO RESOURCES FOR A NETWORK PAGE

(71) Applicant: Amazon Technologies, Inc., Seattle, WA (US)

(72) Inventors: Sean M. Scott, Sammamish, WA (US); Devraj Varadhan, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 348 days.

This patent is subject to a terminal disclaimer.

(21) Appl. No.: 14/796,572

(22) Filed: Jul. 10, 2015

(65) Prior Publication Data
US 2015/0341461 A1 Nov. 26, 2015

Related U.S. Application Data

(63) Continuation of application No. 13/233,109, filed on Sep. 15, 2011, now Pat. No. 9,081,856.

(51) Int. Cl.
*G06F 17/00* (2006.01)
*H04L 29/08* (2006.01)
*G06F 17/30* (2006.01)
*G06F 3/0484* (2013.01)

(52) U.S. Cl.
CPC ...... *H04L 67/2847* (2013.01); *G06F 3/04842* (2013.01); *G06F 17/3082* (2013.01); *G06F 17/30855* (2013.01); *G06F 17/30902* (2013.01); *H04L 67/1097* (2013.01)

(58) Field of Classification Search
CPC ........... G06F 3/04842; G06F 17/30855; G06F 17/30902; H04L 67/2847; H04L 67/1097
See application file for complete search history.

(56) References Cited

U.S. PATENT DOCUMENTS

| | | | |
|---|---|---|---|
| 5,729,549 A | 3/1998 | Kostreski et al. | |
| 6,134,596 A | 10/2000 | Bolosky et al. | |
| 6,166,735 A * | 12/2000 | Dom | G06F 17/30849 707/999.103 |
| 6,249,773 B1 | 6/2001 | Allard et al. | |
| 6,326,982 B1 * | 12/2001 | Wu | H04N 5/44543 348/473 |
| 8,239,359 B2 | 8/2012 | Barsook et al. | |
| 8,437,500 B1 | 5/2013 | Bosworth et al. | |
| 8,468,210 B2 | 6/2013 | Hazy | |
| 8,560,405 B1 | 10/2013 | Buron et al. | |
| 8,577,879 B1 | 11/2013 | Hotchkies et al. | |

(Continued)

*Primary Examiner* — Cong-Lac Huynh
(74) *Attorney, Agent, or Firm* — Thomas | Horstemeyer, LLP

(57) ABSTRACT

Disclosed are various embodiments for prefetching of objects referenced on a network page. An encoded network page referring to at least one item is retrieved. The same item is included on a second network page. In response to an indication of user interest in the item on the first network page, at least an initial portion of a video resource associated with the indicated item and included on the second network page is retrieved. In response to a user selection of the same item, the retrieved initial portion of the video resource is rendered on the second network page.

20 Claims, 6 Drawing Sheets

(56) References Cited

U.S. PATENT DOCUMENTS

| | | | |
|---|---|---|---|
| 8,606,955 B1* | 12/2013 | Fernandes | G06F 17/30899 709/217 |
| 8,849,945 B1 | 9/2014 | Desjardins et al. | |
| 9,042,555 B2* | 5/2015 | Candelore | H04L 67/06 380/200 |
| 2001/0036271 A1 | 11/2001 | Javed | |
| 2002/0161909 A1 | 10/2002 | White | |
| 2003/0004983 A1 | 1/2003 | Cohen | |
| 2005/0076357 A1 | 4/2005 | Fenne | |
| 2006/0035707 A1 | 2/2006 | Nguyen et al. | |
| 2006/0093309 A1* | 5/2006 | Herberger | G11B 27/034 386/280 |
| 2006/0156243 A1 | 7/2006 | Lee et al. | |
| 2006/0230333 A1 | 10/2006 | Racovolis et al. | |
| 2007/0043713 A1 | 2/2007 | Elmi et al. | |
| 2007/0095615 A1 | 5/2007 | Spector | |
| 2007/0118794 A1 | 5/2007 | Hollander et al. | |
| 2007/0139661 A1 | 6/2007 | Varela et al. | |
| 2007/0150360 A1 | 6/2007 | Getz | |
| 2008/0109841 A1 | 5/2008 | Heather et al. | |
| 2008/0120328 A1 | 5/2008 | Delgo et al. | |
| 2008/0140644 A1 | 6/2008 | Franks et al. | |
| 2008/0229182 A1 | 9/2008 | Hendricks et al. | |
| 2008/0267117 A1* | 10/2008 | Stern | H04L 65/4084 370/329 |
| 2008/0282184 A1 | 11/2008 | Rose | |
| 2009/0013288 A1 | 1/2009 | Scheflan | |
| 2009/0043674 A1 | 2/2009 | Minsky et al. | |
| 2009/0077195 A1* | 3/2009 | Gibbs | H04N 7/17318 709/217 |
| 2009/0150784 A1 | 6/2009 | Denney et al. | |
| 2009/0228919 A1 | 9/2009 | Zott et al. | |
| 2009/0235150 A1 | 9/2009 | Berry | |
| 2009/0240683 A1 | 9/2009 | Lazier et al. | |
| 2010/0094703 A1* | 4/2010 | Bramley | G06Q 30/02 705/14.45 |
| 2010/0114726 A1* | 5/2010 | Lee | G06Q 30/02 705/26.1 |
| 2010/0145795 A1 | 6/2010 | Haber et al. | |
| 2010/0199311 A1* | 8/2010 | Chang | H04N 21/4384 725/46 |
| 2010/0199318 A1 | 8/2010 | Chang et al. | |
| 2010/0257449 A1 | 10/2010 | Lieb et al. | |
| 2011/0006971 A1 | 1/2011 | Ebey et al. | |
| 2011/0015979 A1 | 1/2011 | Mansdorf et al. | |
| 2011/0072106 A1* | 3/2011 | Hoffert | G06F 17/30905 709/217 |
| 2011/0169848 A1 | 7/2011 | Bratt et al. | |
| 2012/0002717 A1 | 1/2012 | Ma et al. | |
| 2012/0054041 A1 | 3/2012 | Williams | |
| 2012/0054814 A1 | 3/2012 | Porayath et al. | |
| 2012/0078731 A1 | 3/2012 | Linevsky et al. | |
| 2012/0088561 A1 | 4/2012 | Hohmann et al. | |
| 2012/0110515 A1* | 5/2012 | Abramoff | G06F 17/30994 715/854 |
| 2012/0117058 A1 | 5/2012 | Rubinstein et al. | |
| 2012/0159379 A1 | 6/2012 | Negrillo et al. | |
| 2012/0167146 A1 | 6/2012 | Incorvia | |
| 2012/0185783 A1 | 7/2012 | Avellan et al. | |
| 2012/0216234 A1 | 8/2012 | Kemp | |
| 2012/0233070 A1 | 9/2012 | Calman et al. | |
| 2012/0290387 A1 | 10/2012 | Davis | |
| 2012/0330786 A1 | 12/2012 | Paleja et al. | |
| 2013/0007818 A1 | 1/2013 | Kalidindi et al. | |
| 2013/0013464 A1 | 1/2013 | Mayle et al. | |
| 2013/0061263 A1 | 3/2013 | Issa et al. | |
| 2013/0067354 A1 | 3/2013 | O'Shaugnessy et al. | |
| 2013/0080263 A1 | 3/2013 | Goldman et al. | |
| 2013/0132808 A1 | 5/2013 | Whiting | |
| 2013/0133056 A1 | 5/2013 | Taylor | |
| 2013/0144754 A1 | 6/2013 | Moser | |
| 2013/0159834 A1 | 6/2013 | Johnson et al. | |
| 2013/0208186 A1 | 8/2013 | Malone et al. | |
| 2014/0040049 A1 | 2/2014 | Iida et al. | |
| 2014/0082666 A1* | 3/2014 | Bloch | G11B 27/34 725/37 |
| 2014/0250358 A1 | 9/2014 | Milener et al. | |
| 2014/0337147 A1 | 10/2014 | DaSilva et al. | |
| 2016/0080790 A1* | 3/2016 | Shkedi | G06Q 30/02 725/14 |
| 2017/0126796 A1* | 5/2017 | Hollis | H04L 67/1021 |
| 2017/0228764 A1* | 8/2017 | Tangney | G06Q 30/0244 |

* cited by examiner

PREFETCHING OF VIDEO RESOURCES FOR A NETWORK PAGE

CROSS-REFERENCE TO RELATED APPLICATION

This is a continuation of U.S. patent application Ser. No. 13/233,109, entitled "PRE-FETCHING OF VIDEO RESOURCES FOR A NETWORK PAGE," and filed Sep. 15, 2011, which is incorporated herein by reference in its entirety.

BACKGROUND

Electronic commerce sites typically include a hierarchical product catalog through which a user can navigate. A category page at each level of the hierarchy may include summary information for products in that category. Such sites may also include a product search engine. The summary provided on either a search results page or on a product category page may convey product information in the form of text, still images, and/or video. From either a product category page or search results page, the user may select a link associated with a particular product to get more details about the product. The detail page may include the same or additional descriptive text, still images, and/or video.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to prefetching a video resource associated with an item on one network page in response to an indication of user interest in the same item on another network page. For example, some network pages of an electronic commerce network site may include detailed descriptions of various catalog items. This descriptive information may include video resources in addition to text, graphics, or still images. In various embodiments described herein, when an item on a network page is associated with a video resource, the video resource is prefetched in response to user interest in the same item on another network page, rather than waiting to fetch the video resource when the user requests additional details about the item. For example, the video resource may be prefetched when the user shows initial interest in the item on a category page. The video resource may then be rendered on a product detail page when the user selects the same item from the category page. As another example, the video resource may be prefetched when the user shows initial interest in the item on a search results page. The video resource may then be rendered on a product detail page when the user selects the same item from the search results page. In some embodiments, if the user indicates interest in an item from an initial network page, but does not select the same item after a fixed amount of time, the video resource may be rendered on the initial network page.

The prefetched video reduces playback delay when the user transitions from indicating interest in the item to actually selecting the item in order to obtain more details about the item. In this manner, the prefetched video can begin playing at substantially the same time that the detail network page is rendered. The delay may be so short as to be imperceptible to the user. Various techniques may be used to implement this prefetch, such as instantiating the video player, downloading an initial portion of the resource, instantiating a video object associated with the resource, and/or buffering the downloaded portion into buffers associated with the video object. In the following discussion, a general description of the system and its components is provided, followed by a discussion of the operation of the same.

Figure 1:
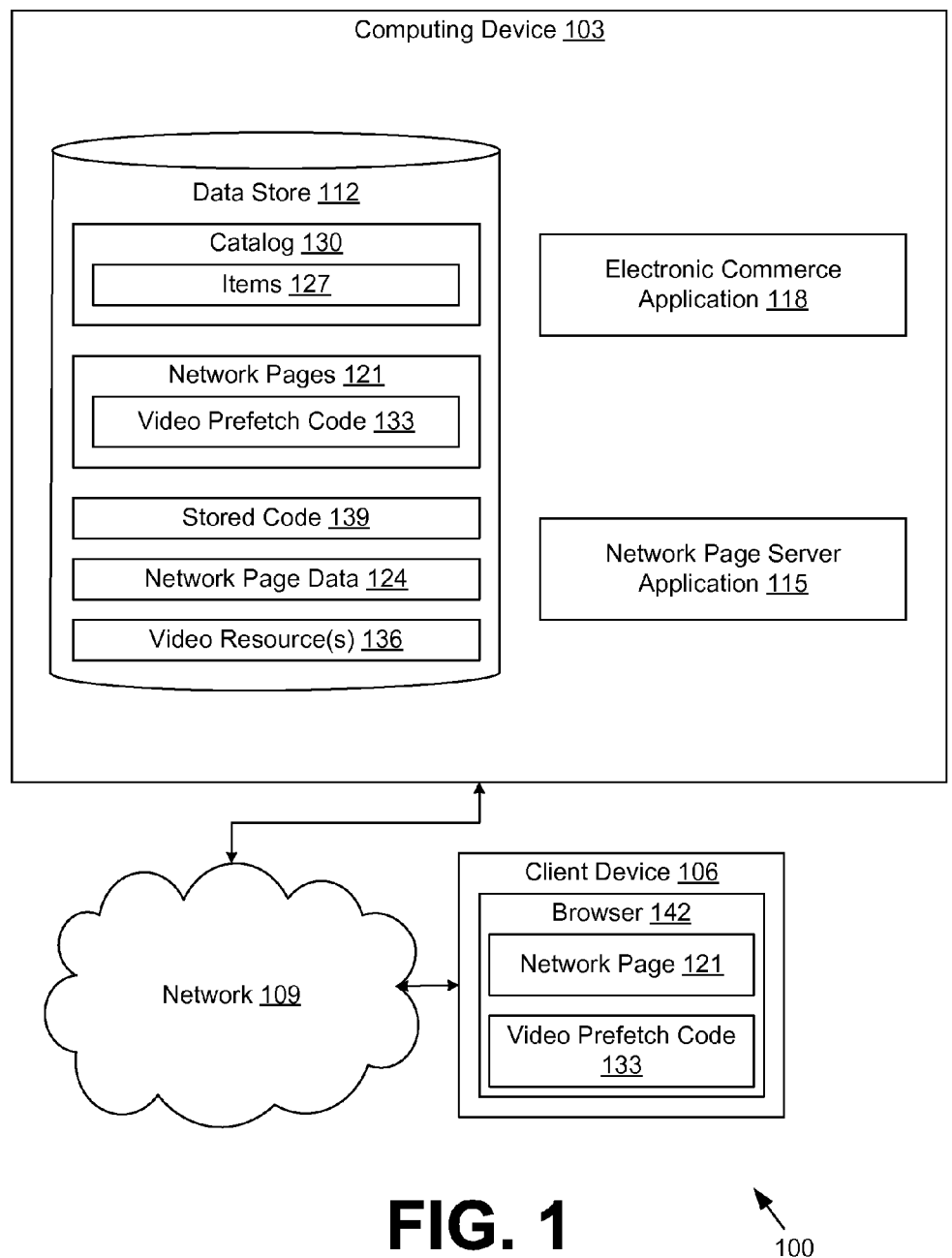
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103 include, for example, a network page server application 115 and an electronic commerce application 118. The components executed on the computing device 103 may also include other applications, services, processes, systems, engines, or functionality not discussed in detail herein.

These components may communicate with each other using various mechanisms, including but not limited to any type of middleware framework. Though shown as logically separate components, the functionality of the network page server application 115 and the electronic commerce application 118 can be combined and/or distributed in various ways, as can be appreciated.

The data stored in the data store 112 includes, for example, network pages 121, network page data 124, items 127 and potentially other data. The items 127 may be included in an electronic catalog 130. As used herein, the term "catalog item" may refer to a product, good, service, software download, multimedia download, social networking profile, or other item 127 that may be offered for sale, purchase, rental, lease, download, and/or any other form of consumption, as may be appreciated. Associated with items 127 and stored in catalog 130 are data such as titles, descriptions, keywords, metadata, weights, customer reviews, multimedia, and other data relating to the items 127. The catalog 130 may be arranged in a hierarchical manner, with categories and subcategories.

The optional electronic commerce application 118, if present, is executed in order to facilitate the online viewing and/or purchase of items and products over the network 109. The electronic commerce application 118 also performs various backend functions associated with the online presence of a merchant in order to facilitate the online purchase of items, as should be appreciated. In embodiments which include the electronic commerce application 118, the catalog of items comprises a product catalog of items offered for sale so that data associated with items 127 comprises product data.

The network page server application 115 is executed to generate network pages 121. In some embodiments, the network pages 121 contain information about items 127 in the catalog 130. To this end, the network page server application 115 uses network page data 124, which may include any type of data related to the generation of network pages 121. Such data may include, for example, templates, style sheets, executable code, interpreted code, hypertext markup language (HTML), extensible markup language (XML), still images, video, text, graphics, and any other type of data that may be used in network pages 121. The network page server application 115 may comprise a commercially available hypertext transfer protocol (HTTP) server such as, for example, Apache® HTTP Server, Microsoft® Internet Information Services (IIS), and other servers.

A network page 121 generated by the network page server application 115 includes references, links and/or hyperlinks to resources. These resources may be stored in files separate from the network page 121. The resources may be media objects such as graphics, still images, audio, video, and/or multimedia. The resources may also be code objects such as executable code or scripting code.

The network page 121 may also include video resource prefetch code 133 which is executed by the client device 106 to prefetch one or more video resources 136 referenced in a network page 121. The network page 121 with the video resource prefetch code 133 is provided to the client device 106, which allows a browser to prefetch and render more quickly the video resource 136 referenced in a network page 121, before the user actually takes a specific action to cause retrieval of the network page 121 which includes the video resource 136. As used herein, the term "video" means a series or time sequence of images. In contrast, a "still image" is a single image. However, the sequence of images may be associated with other types of information, such as audio or text, and the term "video" includes files or streams which contain other types of information in addition to a stream of images.

The network page server application 115 may be configured to generate the video resource prefetch code 133 for a specific network page 121 and/or client device 106 based on stored code 139 in the data store 112. The stored code 139 may include, for example, JavaScript, dynamic HTML (DHTML), Ajax, and any other type of code that may be executed in a client device 106 from within a network page 121. The stored code 139 may also include asynchronous exchange of data with the network page server application 115 or with other applications, using Ajax, simple object access protocol (SOAP), remote procedure call (RPC), and/or other technologies.

Having discussed the computing device 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, an electronic book reader, or other devices with like capability.

The client device 106 may be configured to execute various applications such as a browser 142 and other applications. The browser 142 may be executed in a client device 106, for example, to access and render network pages 121 or other network content served up by the network page server application 115, thereby generating a rendered network page. The video resource prefetch code 133 that is included within a network page 121 may be executed in the context of the browser 142. The client device 106 may be configured to execute applications beyond the browser 142 such as, for example, email applications, instant message applications, and/or other applications.

A general description of the operation of the various components of the networked environment 100 is provided. To begin, the browser 142 requests a first network page 121 from the network page server application 115. The requested network page 121 may be, for example, a main or home network page for a particular network site. The requested network page 121 may also be a search results page from a general-purpose search engine, or from a site-specific search engine. In some embodiments, the network site may be an electronic commerce marketplace, and in such cases, the first network page 121 may be a category page for a particular category of products.

The network page server application 115 provides the first network page 121 in response to the request, where this first network page 121 includes information about items 127 and/or about categories of items 127. For each item 127, for example, the network page 121 may include a description, a price, size, color, etc. The first network page 121 also includes video resource prefetch code 133. For at least one of the items 127, the network page 121 also includes a reference or link to a second network page 121 associated with the corresponding item 127. This second network page 121 includes a video resource 136 associated with the item 127. No action is taken in connection with the video resource 136 upon retrieval of the first network page 121, since the user has not taken any action involving a particular item 127. However, once a user takes action that indicates interest in a particular item 127 on the first network page 121, the video resource prefetch code 133 included in the network first page 121 operates to reduce the delay for viewing a video resource 136 that is associated with the item 127 of interest and that appears on a second network page 121.

In this regard, the video resource prefetch code 133 retrieves at least an initial portion of the video resource 136 that is associated with the item 127 of interest. This retrieval begins when the user indicates interest in a particular item 127 from the first network page 121, as opposed to waiting until the user requests additional details about the item 127. Thus, in some embodiments the video resource prefetch code 133 begins retrieval of the video resource 136 when the cursor or pointing device hovers over an item 127, rather than waiting until the user selects the item 127 by clicking on the item 127 on the first network page 121.

If the user selects the item 127 of interest, the browser 142 requests a second network page 121 that is specific to the selected item 127. The video resource prefetch code 133 begins to render the video resource 136 within the second network page 121. In the context of video, rendering corresponds to playback using a video player or media player application or component. After the initial portion of the video resource 136 is retrieved, the remainder of the video resource 136 is rendered or played back. The user experiences playback of the entire video resource 136, from start to finish, occurring at substantially the same time as the item-specific network page 121 is rendered, thus enhancing the user experience.

Figure 2A:
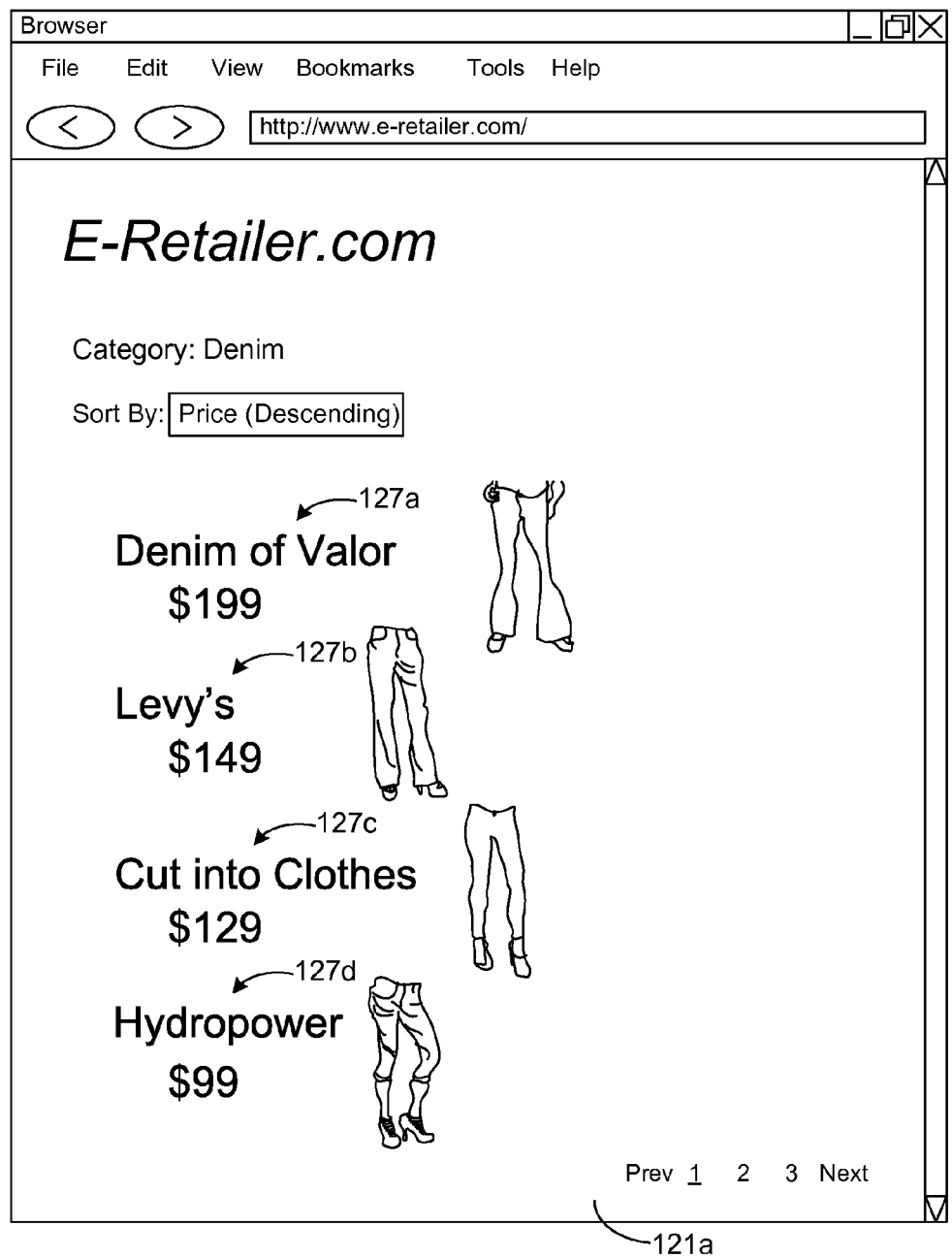
FIGS. 2A, 2B, and 2C are drawings of example network pages rendered by a client in the networked environment of FIG. 1 according to various embodiments of the present disclosure.

Referring next to FIG. 2A, shown is one example of a network page 121a rendered in a browser 142 (FIG. 1) executing in the client device 106 (FIG. 1) in the networked environment 100 (FIG. 1). In the illustrated example, network page 121a depicts browsing within a category of items 127, such as, for example, denim or other items 127. In this particular scenario, four items 127 are shown in the category: item 127a, item 127b, item 127c, and item 127d. Various information from the catalog 130 (FIG. 1) is displayed in conjunction with each item 127. In the example network page 121a, the displayed item data includes title of the item 127, price of the item 127, and an image associated with the item 127. Other information regarding the item 127 may be present in other embodiments.

Figure 2B:
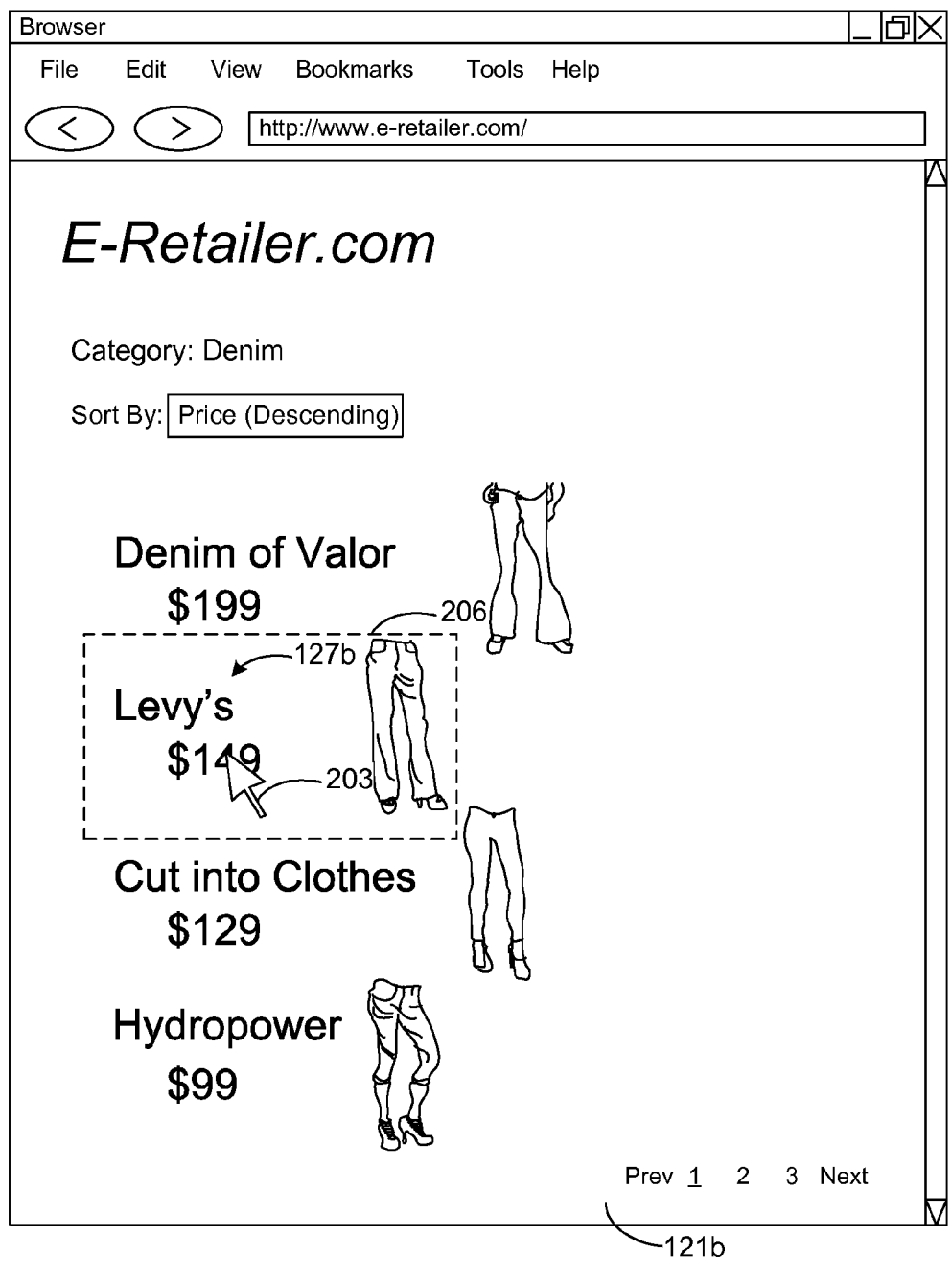

Turning now to FIG. 2B, shown is another example of a network page 121b rendered in a browser 142 (FIG. 1) executing in the client device 106 (FIG. 1) in the networked environment 100 (FIG. 1). In the network page 121b depicted in FIG. 2B, a user takes an action which indicates interest in one of the items 127. One example of an action indicating user interest may be "hovering" over the item 127 by placing a pointer 203 over a page region 206 corresponding to the item 127, and leaving the pointer in the region for a predetermined period of time. Another example of an action indicating user interest may be moving a pointer 203 toward an item 127. Other actions may also be used to indicate user interest, as should be appreciated. For actions involving a pointer, the pointer may be manipulated by a keyboard, a mouse, or a pointing device of any kind. The action indicating user interest is distinct from the action that a user takes to specifically select an item 127 (e.g., clicking on the item 127).

At least one of the items 127 referenced by the first network page 121a is included on a second network page 121. For example, if the first network page 121a is a search results page or a category page, the second network page 121 may be a detail page including more detailed information about a particular search result. The second network page 121 which includes a particular item 127 may also include a video resource 136 associated with the item 127. For example, when the item 127 is an article of clothing, the video resource 136 may show a person modeling the clothing. As another example, when the item 127 is an electronics device, the video resource may demonstrate various features of the device. As described in further detail below, the video resource prefetch code 133 (FIG. 1) responds to the indication of user interest in a particular item 127 on the first network page 121a by beginning to retrieve the associated video resource 136.

Figure 2C:
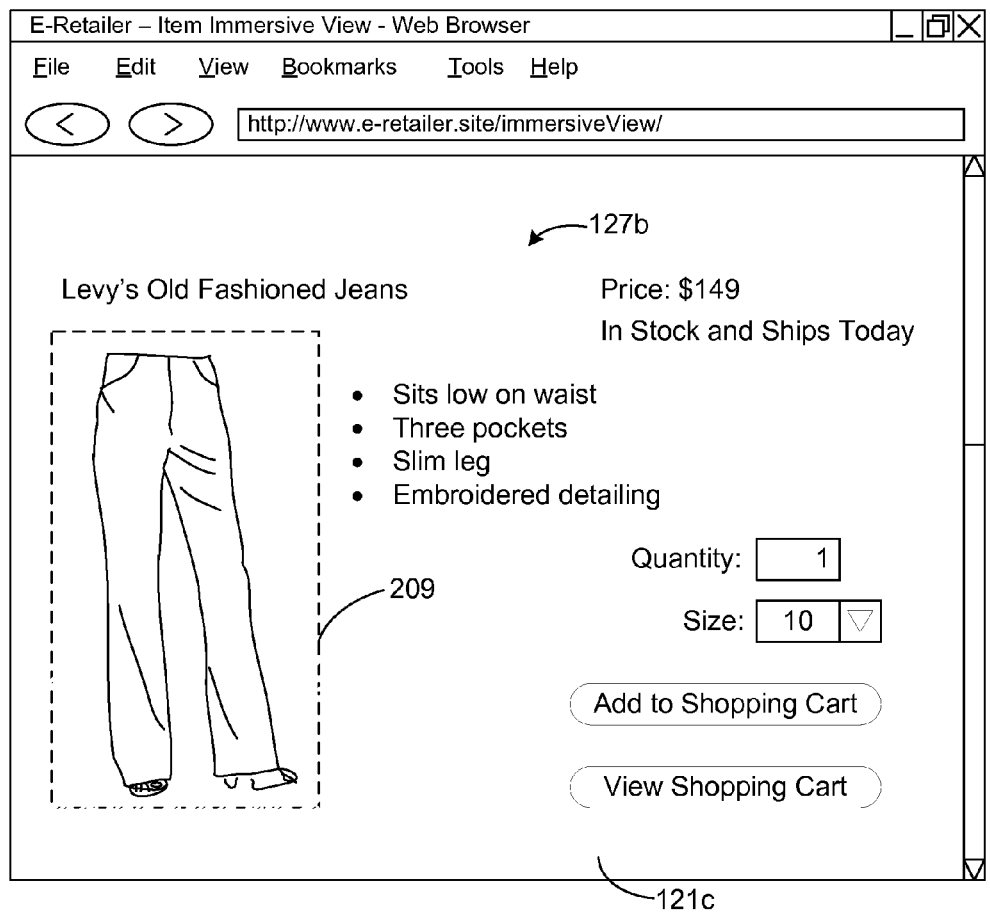

Moving on to FIG. 2C, shown is another example of a network page 121c rendered in a browser 142 (FIG. 1) executing in the client device 106 (FIG. 1) in the networked environment 100 (FIG. 1). The network page 121c depicted in FIG. 2C is displayed as a result of the user selecting the item in which interest was previously indicated. In this scenario, the item of interest is item 127b. Thus, network page 121c represents a second page 121 which includes the item 127b which was referred to in the first network page 121a and in which the user indicated interest.

The network page 121c includes various information from the catalog 130 such as title of the item, price of the item, shipping status of the item, and item description information. Other information regarding the item may be present in other embodiments. The network page 121c also includes a video resource area 209. A video resource 136 associated with the previously selected item 127 is rendered, i.e., plays back in this area 209. As noted above, video resource prefetch code 133 begins retrieving a video resource 136 associated with an item 127 when the user indicates interest in that item. In this manner, the video resource 136 begins rendering on the second network page 121c substantially immediately after the second network page 121c is retrieved. In some embodiments, a still image or a series of still images may be rendered in the video resource area 209 if the video resource 136 is not yet ready for playback at the time the network page 121c is rendered.

Various controls are provided in the network page 121c such as a quantity selection component and a size selection component. Such components are presented in FIG. 2C as drop-down boxes, but they may be buttons, sliders, links, images, etc., in other embodiments. It is understood that other components for selecting options and features of an item may be present in other embodiments. The network page 121c also includes a view shopping cart component and an add to shopping cart component for adding the current item to the shopping cart of the user. In other embodiments, the item may be added to lists other than a shopping cart such as wish lists, user lists, gift registries, and/or other lists of items.

The network pages 121a-c shown in FIGS. 2A-C are merely examples of a network page 121 used in conjunction with the video prefetch feature described herein. It is understood that the video prefetch feature may be used in conjunction with a search results network page, a gateway network page, a category network page, a detail network page, and/or any other network page that features items 127.

Figure 3:
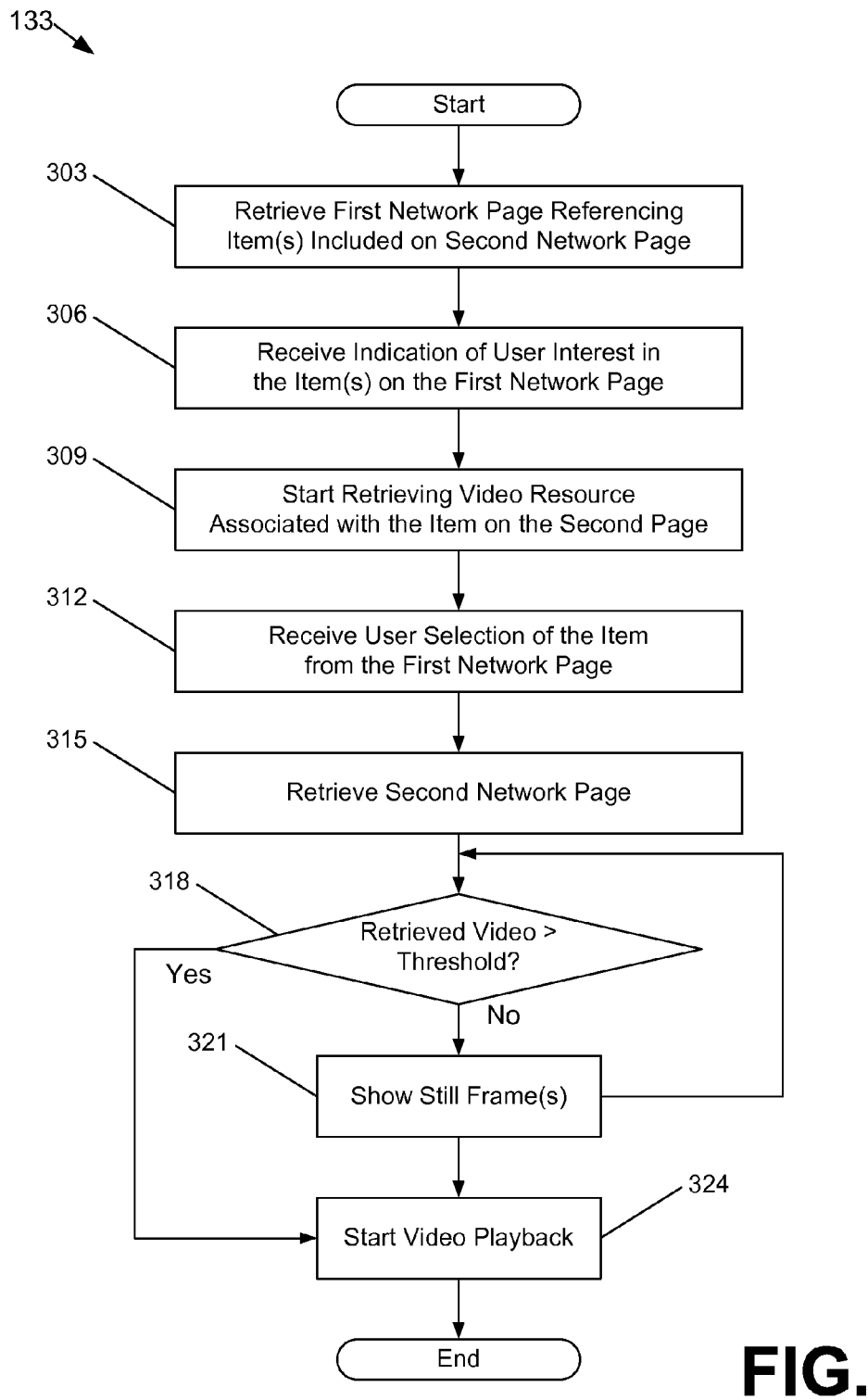
FIG. 3 is a flowchart illustrating an example of functionality implemented as portions of video resource prefetch code executed in a client device in the networked environment of FIG. 1 according to various embodiments of the present disclosure.

Turning now to FIG. 3, shown is a flowchart that provides one example of the operation of a portion of the browser 142 (FIG. 1), in conjunction with the video resource prefetch code 133 (FIG. 1) according to various embodiments. It is understood that the flowchart of FIG. 3 provides merely an example of the many different types of functional arrangements that may be employed to implement the operation of the portion of the browser 142 and the video resource prefetch code 133 as described herein. As an alternative, the flowchart of FIG. 3 may be viewed as depicting an example of steps of a method implemented in the client device 106 (FIG. 1) according to one or more embodiments.

Beginning at box 303, the browser 142 executing on the client device 106 retrieves from computing device 103 (FIG. 1) a first network page 121*a* (FIG. 2A). The network page 121*a* references one or more items 127, such as catalog items. At least one item 127 that is referenced in the network page 121*a* is also included on a corresponding second network page 121*b* (FIG. 2C). As one example, the first network page 121*a* may be a search results page in which each item 127 appears in a list of search results, and a second network page 121*b* is a detail page with additional details about a particular item 127. As another example, the first network page 121*a* may be a category page in which each item 127 appears in a list of items belonging to a particular category. Once the first network page 121*a* has been retrieved, the browser 142 renders the network page 121*a* on a display coupled to computing device 103.

Once the first network page 121*a* is at least partially rendered by the browser 142, a user can interact with the first network page 121*a*, for example, by various actions such as clicking, pointing, dragging, and selecting. Next, at box 306, the video resource prefetch code 133 receives an indication from the user of interest in one of the items 127 on the first network page 121*a*. In some embodiments, the indication may be an event corresponding to the cursor or pointing device hovering over an item 127. In other embodiments, the indication may be an event corresponding to the cursor or pointing device moving toward an item 127.

As noted above, items 127 displayed by the first network page 121*a* are also included on a respective second network page 121*b*. A second network page 121*b* includes at least one video resource 136 that is associated with the item 127 on the network page 121*b*. Having received an indication of user interest in an item 127, the video resource prefetch code 133 operates to facilitate playback of the associated video resource 136 within the network page 121*b*, as follows. At box 309, the video resource prefetch code 133 starts retrieving or downloading the video resource 136 that is associated with the item 127 of interest. If no video resource 136 is associated with the item 127 of interest, no action is needed at box 309, as should be appreciated.

In some embodiments, the functionality of box 309 retrieves the entire video resource 136. In other embodiments, the functionality of box 309 performs only a partial download of an initial portion of the video resource 136. When a partial download is performed, various techniques may be used to set size of the downloaded portion. As one example, the initial download may be limited to a specific number of bytes. As another example, the initial download may be limited to a specific amount of playback time. As yet another example, the initial download may be limited to a specific percentage or proportion of the entire video resource 136.

In still other embodiments, box 309 conditionally performs either a full or partial download, depending on availability of resources such as the available bandwidth on the network connection for client device 106 or the available memory for client device 106. Thus, the entire video resource 136 may be retrieved in response to the user indication of interest on a client with more resources, while only the first part of the video resource 136 may be retrieved on a client with fewer resources.

The download started at box 309 continues while processing moves on to box 312, where the browser 142 receives a user selection of the item 127 which the user had previously indicated to be of interest at box 306. Next, at box 315 the browser 142 retrieves from computing device 103 (FIG. 1) a second network page 121*b*. As noted above, the second network page includes a reference to a video resource 136 that is associated with an item 127 on the first network page 121*a*. As also noted above, retrieval of that video resource 136 was started at box 209.

At box 318, the amount of video already retrieved is compared to a predefined threshold. If at box 318 it is determined that the threshold has not been reached, then processing continues at box 321. If at box 318 it is determined that the threshold has been reached, then processing continues instead at box 324. In some embodiments, the threshold for a sufficient download is an amount such that the video can finish playing from buffers, without having to retrieve any remaining portions over the network 109. In other embodiments, a download may be considered sufficient if playback, once started, proceeds without an interruption that is noticeable to the user. That is, additional retrieval from the network 109 is allowed as long as the latency does not affect the user experience.

Having determined that sufficient video has not been downloaded at the time the user selected the second network page 121*b*, then at box 321 the video resource prefetch code 133 displays the first frame of the video resource 136 in the video resource area 209. In other embodiments, the video resource area 209 remains blank until video playback begins. Regardless of the contents of the video resource area 209, the initial partial render of second network page 121*b* includes the regions of the network page 121 corresponding to the items 127, which may display text describing the items 127, as well as links to other network pages, as should be appreciated. Having partially rendered the second network page 121*b*, processing then continues at box 318, where it is determined once again whether or not sufficient video has been retrieved.

When at box 318 it is determined that sufficient video has been downloaded, then at box 321 the video resource prefetch code 133 begins playback of the downloaded video resource 136 in the video resource area 209 (FIG. 2C) of the second network page 121*b*. In this manner, the second network page 121*b* is partially rendered until sufficient video has been retrieved, at which point the video playback begins. Subject to the effects of network latency, video frame rate, and other parameters, the techniques described herein allow the prefetched video resource 136 to be rendered at substantially the same time that the rest of the network page 121*b* is rendered.

The process of FIG. 3 is then complete. Although not shown in FIG. 3, the download started at box 309 continues to execute while the playback buffers fill and while the playback occurs. Then, as the download progresses, the playback buffers are filled with new data from the download. Thus, the playback of the video resource 136 continues until the entire video is consumed, or until the user stops or pauses the playback.

In some embodiments, the network page 121*b* also includes a still image associated with the item 127 of interest. In such embodiments, the browser 142 and/or the video resource 136 renders the still image after playback of the video resource 136 is complete. Thus, the user sees the video transition to a still image, where this transition may involve a special effect such as a fade. In some embodiments, the browser 142 and/or the video resource 136 repeats playback of the video resource 136 until the user interacts with another item 127, another area of the network page 121, or a link to another network page 121.

The prefetching and loading of the video resource 136 performed by the video resource prefetch code 133 described herein enhances the user experience by reducing the wait, lag, or delay in viewing the video resource 136 associated with the item 127 of interest. The size of the partial download may be chosen so that the download is expected to finish at about the same time as, or before, the playback of the initial portion finishes. Thus, in some embodiments, the user may experience only minimal wait, lag, or delay in viewing the video resource 136 associated with the item 127 of interest, and this minimal time may not even be perceptible to the user.

In some embodiments, upon receiving an indication of user interest at box 306, the video resource prefetch code 133 instantiates a video player corresponding to one or more of the video resources 136 included on the second network page 121b. That is, the video resource prefetch code 133 identifies a video player that supports the particular video format of a video resource 136. To determine the video format, the video resource prefetch code 133 may parse the reference to the video resource 136, or a portion of the video resource 136 itself. A non-limiting list of video formats includes MPEG, AVI, QuickTime, Flash, and video formats supported by HTML5. Once the format of the video resource 136 is determined, the video resource prefetch code 133 uses this information to select an appropriate video or media player that supports this format. The video resource prefetch code 133 then instantiates or loads the video player, using any suitable mechanism supported by the browser 142 or by the operating system executing on the client device 106, as should be appreciated. In some embodiments, the instantiation at box 306 occurs when a main network page or home network page is retrieved so that player instantiation happens only once per network site visit, rather than each time a network page 121 on the site is retrieved.

In some embodiments, upon indication of user interest in an item 127 on the first network page 121a, the video resource prefetch code 133 instantiates or loads a video object corresponding to one of the video resources 136 included on the second network page 121b. The video object includes, or is associated with, video playback buffers. The instantiation mechanism may be specific to the video player, browser, and/or operating system executing on the client device 106, as should be appreciated. Having instantiated a video object that is associated with playback buffers, the video resource prefetch code 133 starts filling the video object playback buffers from the video portion that was previously downloaded starting at box 209.

Figure 4:
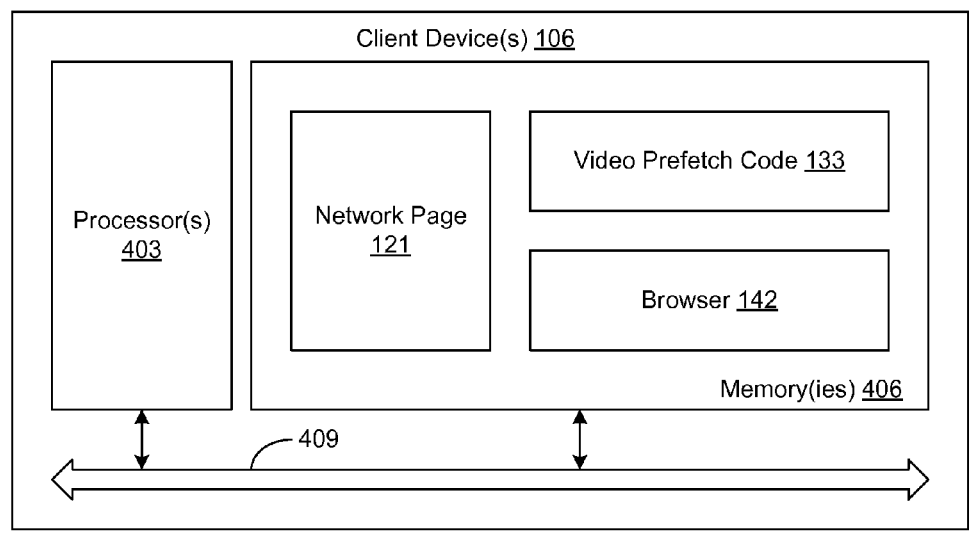
FIG. 4 is a schematic block diagram that provides one example illustration of a client device employed in the networked environment of FIG. 1 according to various embodiments of the present disclosure.

Turning now to FIG. 4, shown is a schematic block diagram of the client device 106 according to an embodiment of the present disclosure. The client device 106 includes at least one processor circuit, for example, having a processor 403 and a memory 406, both of which are coupled to a local interface 409. To this end, the client device 106 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the browser 142, the video resource prefetch code 133, and potentially other applications. In addition, an operating system may be stored in the memory 406 and executable by the processor 403. While not illustrated, the computing device 103 (FIG. 1) also includes components like those shown in FIG. 4, whereby the browser 142 is stored in a memory and executable by a processor.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and executed by the processor 403, source code that may be expressed in proper format such as object code that is capable of being loaded into a random access portion of the memory 406 and executed by the processor 403, or source code that may be interpreted by another executable program to generate instructions in a random access portion of the memory 406 and executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network 109 (FIG. 1) that facilitates communication between any two of the multiple processors 403, between any of the processors 403 and any of the memories 406, or between any two of the memories 406, etc. The local interface 409 may comprise additional systems designed to coordinate this communication, including, for example, performing load balancing. The processor 403 may be of electrical or of some other available construction.

Although the network page server application 115, the electronic commerce application 118, the browser 142, the video resource prefetch code 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the video resource prefetch code 133 and the browser 142. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in the flowchart of FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the network page server application 115, the electronic commerce application 118, the browser 142, and the video resource prefetch code 133) that comprises software or code can be embodied in any non-transitory computer-readable medium for use by or in connection with an instruction execution system such as, for example, the processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
   identify an indication of user interest corresponding to an item presented in first network content being rendered by a display;
   download a portion of a video resource to be rendered by the display via second network content in response to identifying the indication of user interest corresponding to the item and prior to receiving a selection of the item presented in the first network content, the selection corresponding to a request for the second network content, and the second network content being associated with the item presented in the first network content;
   retrieve the second network content in response to receiving the selection of the item presented in the first network content; and
   cause the second network content to be rendered by the display, the second network content including the portion of the video resource.

2. The non-transitory computer-readable medium of claim 1, wherein the first network content comprises a plurality of selectable components associated with a plurality of different items, and identifying the indication of user interest further comprises identifying at least one of: a cursor hovering over a selectable component of the plurality of selectable components associated with the item for a predefined period of time, or the cursor moving towards the selectable component associated with the item.

3. The non-transitory computer-readable medium of claim 1, wherein, when executed, the program further causes that computing device to at least retrieve a remaining portion of the video resource in response to receiving the selection of the item in the first network content.

4. The non-transitory computer-readable medium of claim 3, wherein, when executed, the program causes the computing device to at least cause the remaining portion of the video resource to be rendered by the display after playing of the portion of the video resource is complete.

5. The non-transitory computer-readable medium of claim 1, wherein the first network content includes a catalog of items, and the second network content includes an item detail page specific to the item.

6. The non-transitory computer-readable medium of claim 1, wherein, when executed the program further causes the computing device to at least determine a size of the portion of the video resource to be downloaded based at least in part on a predefined percentage of the video resource.

7. The non-transitory computer-readable medium of claim 1, wherein, when executed, the program further causes the computing device to at least determine a size of the portion of the video resource to be downloaded based at least in part on a predefined number of bytes.

8. The non-transitory computer-readable medium of claim 1, wherein, when executed, the program further causes the computing device to at least determine a size of the portion of the video resource to be downloaded based at least in part on a predefined amount of playback time.

9. A system, comprising:
   at least one computing device; and
   a media prefetch application executable by the at least one computing device, wherein, when executed, the media prefetch application causes the at least one computing device to at least:
      identify an indication of interest corresponding to an item based at least in part on an interaction with first network content being rendered by the at least one computing device, the first network content including a selectable component associated with the item;
      download a portion of a video resource in response to the indication of interest and prior to a selection of the selectable component associated with the item, the selectable component corresponding to a request for second network content;
      retrieve the second network content in response to the selection of the selectable component on the first network content; and
      cause the second network content to be rendered by the at least one computing device, the second network content including the portion of the video resource.

10. The system of claim 9, wherein, when executed, the media prefetch application further causes the at least one computing device to at least download a remaining portion of the video resource in response to the selection of the selectable component.

11. The system of claim 9, wherein, when executed, the media prefetch application further causes the at least one computing device to at least determine a size of the portion of the video resource to be downloaded based at least in part on at least one of: a predefined percentage of the video resource, a predefined number of bytes, a predefined amount of playback time, an available bandwidth of a network connection associated with the at least one computing device, or an available memory for the at least one computing device.

12. The system of claim 9, wherein the first network content comprises a catalog of items.

13. The system of claim 9, wherein the second network content comprises a detailed description of the item.

14. The system of claim 9, wherein the selection is a user selection.

15. The system of claim 9, wherein the indication of interest is identified in response to detecting at least one of: a cursor hovering over the selected component for a predefined period of time, or the cursor moving towards the selectable component.

16. A method, comprising:
   identifying, via a computing device, an indication of user interest corresponding to an item displayed in first network content being rendered by a display;
   downloading, via the computing device, a portion of a video resource associated with the item in response to the indication of user interest and prior to receiving a selection of the item displayed in the first network content, the selection corresponding to a request for second network content, and the portion of the video resource to be rendered by the second network content; and
   causing, via the computing device, the portion of the video resource to be rendered by the second network content in response to receiving the selection of the item displayed in the first network content.

17. The method of claim 16, wherein the portion of the video resource that is downloaded is based at least in part on at least one of: a predefined percentage of the video resource, a predefined number of bytes, a predefined amount of playback time, an available bandwidth of a network connection associated with the computing device, or an available memory of the computing device.

18. The method of claim 16, further comprising downloading, via the computing device, a remaining portion of the video resource in response to receiving the selection of the item.

19. The method of claim 16, wherein the first network content comprises a selectable component associated with the item, a selection of the selectable component corresponding to the selection of the item displayed in the first network content.

20. The method of claim 16, further comprising:
   determining, via the computing device, a format associated with the video resource;
   selecting, via the computing device, a media player that supports the format; and
   instantiating, via the computing device, the media player to play the video resource.

* * * * *